US000001428H

United States Statutory Invention Registration [19]

[11] Reg. Number: H1428

Ohkanda

[43] Published: Apr. 4, 1995

[54] RECIPROCATING CUTTER TYPE TRIMMER

[75] Inventor: Masao Ohkanda, Sagamihara, Japan

[73] Assignee: Kioritz Corp., Tokyo, Japan

[21] Appl. No.: 100,136

[22] Filed: Aug. 2, 1993

[30] Foreign Application Priority Data

Aug. 14, 1992 [JP] Japan ..... 4-057314 U

[51] Int. Cl.[6] ..... B26B 9/02; B26B 19/00

[52] U.S. Cl. ..... 30/210; 30/223; 30/227; 30/355

[58] Field of Search ..... 30/196, 197, 199, 208, 30/209, 210, 223, 225, 226, 227, 228, 266, 351, 355, 357, 369; 83/697, 698, 838, 955

[56] References Cited

U.S. PATENT DOCUMENTS

| | | | |
|---|---|---|---|
| 3,316,636 | 5/1967 | Raper, Jr. et al. | 30/210 |
| 3,929,050 | 12/1975 | Salzwedel | 30/355 X |
| 4,027,390 | 6/1977 | Kendzior | 30/355 |
| 5,031,324 | 7/1991 | Berghauser et al. | 30/369 |

FOREIGN PATENT DOCUMENTS 2-6422 1/1990 Japan .

*Primary Examiner*—David Brown
*Attorney, Agent, or Firm*—Cushman, Darby & Cushman

[57] ABSTRACT

A reciprocating cutter type trimmer having reciprocative blades, each blade is divided into a power transmission member and an edge member, and the edge member has, at its longitudinally opposite ends, fitting parts so as to be removably mountable to a fitting part provided for the power transmission member.

1 Claim, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RECIPROCATING CUTTER TYPE TRIMMER

BACKGROUND OF THE INVENTION

1. Field of the Invention

The present invention relates to reciprocating cutter type trimmers and more particularly to a reciprocating cutter trimmer in which a pair of upper and lower blades are subjected to reciprocation by means of power transmission means such as eccentric cams.

2. Description of the Prior Art

In the reciprocating cutter type trimmer used for trimming work of trees and grass, such as clipping of weeds at ridges and service waterways, mowing of turfs and trimming of hedges, the output of a power source such as an internal combution engine arranged at one end of an operation rod is typically transmitted to a blade unit through a power transmission unit to reciprocate a pair of upper and lower elongated blades in the longitudinal direction so as to cut trees and grass.

When reciprocating cutter blades are reciprocated to do work in this manner, the edge of the blade will be worn out or broken. Then, for exchanging of the blade or polishing thereof, the power transmission unit must be disassembled and troublesome removal, dismounting and assembly work has to be done. Under the circumstances, in order to facilitate such work as the removal and exchange of the blade, it has hitherto been known to make only the blade unit separate as described in, for example, Japanese Utility Model Application Laid-open No. Hei 4-60018 and Japanese Utility Model Application Laid-open No. Hei 2-6422 as well as the specification of Japanese Utility Model Application No. Hei 3-106427. FIG. 5 is a plan view showing the essential part of such a conventional separation type blade.

In FIG. 5, a crank lever 60 for conversion of rotary motion into linear reciprocation is formed with a laterally elongated hole 61 in which a cam, not shown, is received at one end thereof, whereby as the cam rotates within the elongated hole 61, rotary motion of the cam is converted into linear reciprocation of the crank lever 60. A connecting lug 62 is formed at the other end of the crank lever 60 and it is removably fitted in a cut 71 formed at one end of a blade 70. With the lug fitted in the cut in this manner, the crank lever and the blade are made to be integral with each other for linear reciprocation.

In the above-described conventional reciprocating cutter type trimmer, however, when the trimmer is used frequently in, for example, work which uses only the tip of the blade, for example, such work as clipping of grass at ridges, only the tip (fore end) of the blade is often worn out or broken, raising a problem that the blade must be exchanged or ground frequently for a small frequency of operation.

SUMMARY OF THE INVENTION

The present invention has solves the above problem and it is an object of the present invention to provide an economic reciprocating cutter type trimmer simple in construction and which permits easy changing of mounting direction of the blade so as to maintain a long life of the separation type blade per se.

According to the present invention, to accomplish the above object, in a reciprocating cutter type trimmer having separation type blades each of which is divided into a power transmission member drivingly coupled to a power transmission unit for conversion of rotary motion into reciprocation so as to be slidably reciprocative in the longitudinal direction and an edge member, each of the power transmission member and the edge member being formed with a f i t ting part so as to be removably connectable to each other, the edge member has, at its longitudianlly opposite ends, fitting parts engageable with the fitting part of the power transmission member.

In the reciprocating cutter type trimmer according to the present invention constructed as above, when the tip of the edge member is worn out or broken and exchange or grinding of the blade is needed, only the edge member is removed from the power transmission unit and its direction is changed, and the fitting part formed at the longitudinally opposite end of the edge member is brought into engagement with the fitting part of the power transmission member to thereby permit the edge member to again have a sharp edge at the tip of the blade.

DESCRIPTION OF THE PREFERRED EMBODIMENTS

Figure 1:
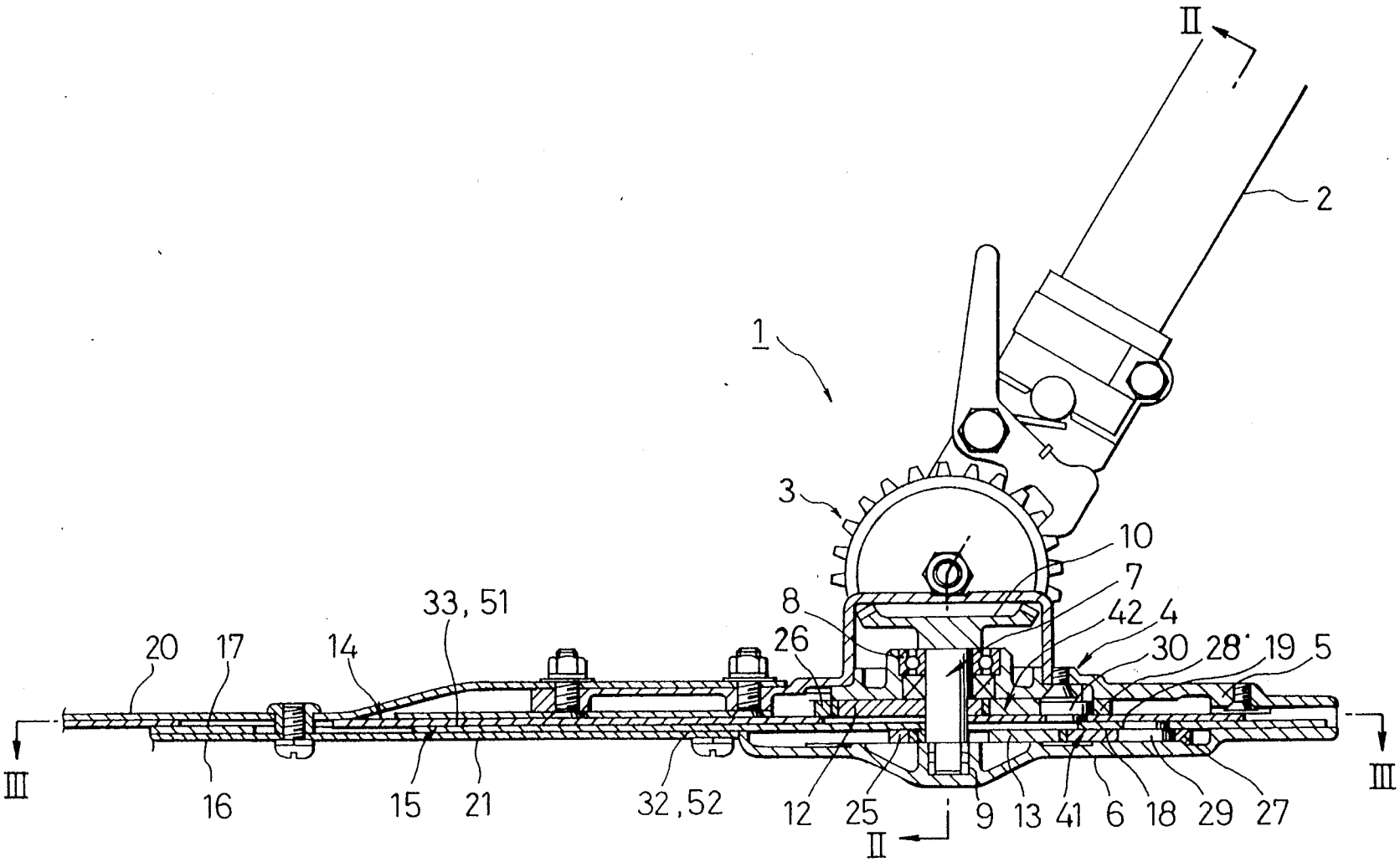
FIG. 1 is a longitudial sectional view of a reciprocating cutter type trimmer according to the present invention.
Figure 2:
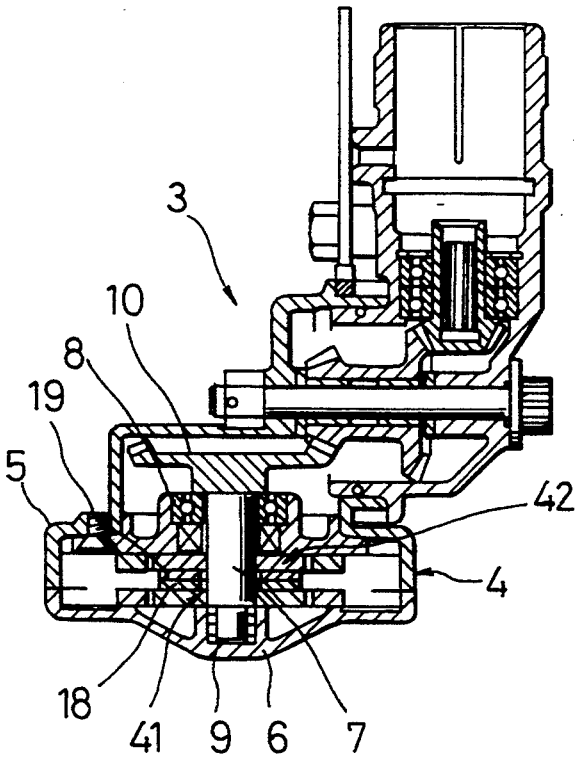
FIG. 2 is a sectional view as viewed in the direction of arrow II—II in FIG. 1.
Figure 3:
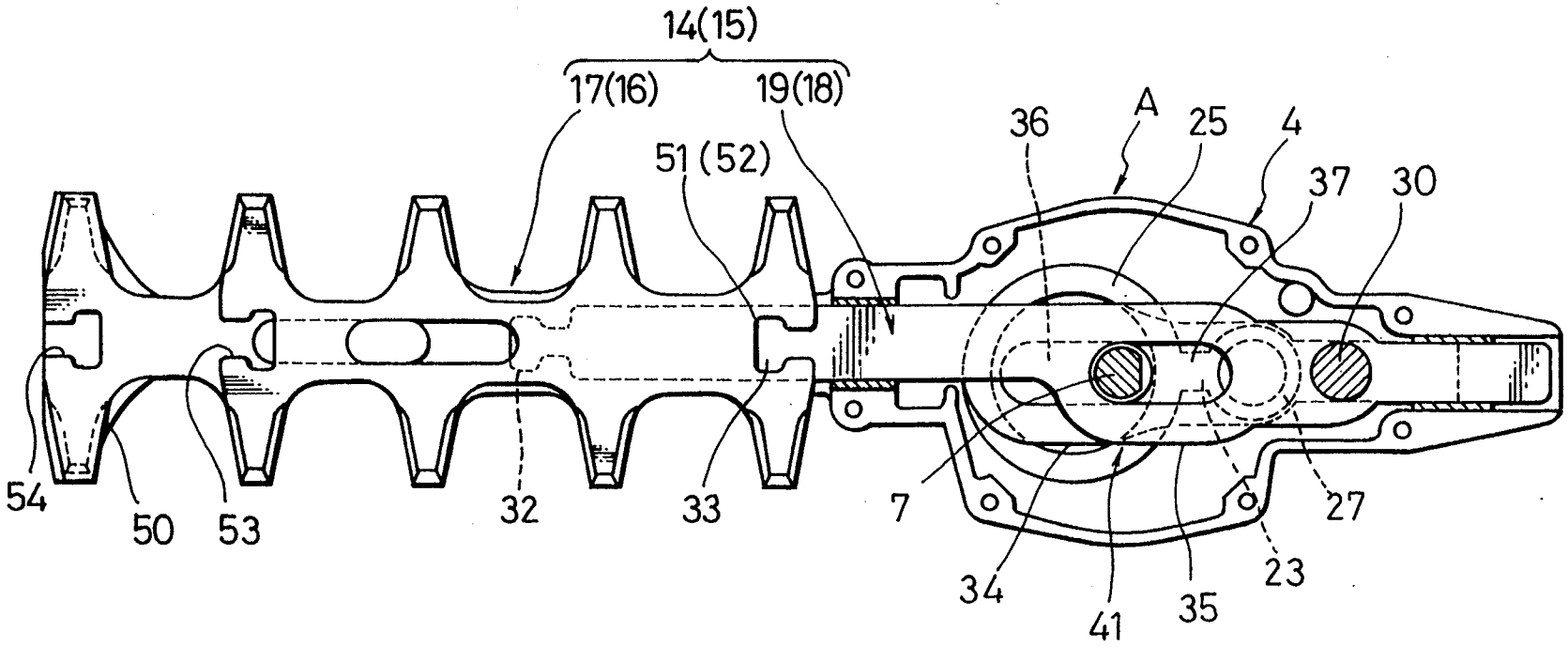
FIG. 3 is a plan view partly exploded to show a blade and a power transmission member.

An embodiment of the present invention will be described hereunder with reference to the accompanying drawings.

A reciprocating cutter type trimmer 1 has a case 4 attached. At a variable angle, to the tip of a gear reduction unit 3 coupled to the tip of an operation rod 2 of the trimmer. The case 4 consists of upper and lower halves 5 and 6 which are put together by means of a plurality of bolts. A main shaft 7 driven by a power transmission shaft (not shown) in the operation rod 2 is supported rotatably and vertically by the case 4 through bearings 8 and 9, and the main shaft 7 is integrally connected to an output gear 10 of the gear reduction unit 3. Provided on the main shaft 7 are a pair of circular eccentric cams 12 and 13 which are spaced apart from each other vertically in the axial direction of the main shaft 7, these eccentric cams 12 and 18 being oriented so as to have a phase difference from each other through an angle of 180°.

Further, a pair of separation type, elongated plate-like upper and lower blades 14 and 15 are arranged so as to protrude frontally and exteriorly of the case 4, having their frontal edge members 16 and 17 supported respectively on an upper guide member 20 and a lower guide member 21 which extend from the side of the case 4.

The power transmission members, designated at reference numerals 18 and 19, have their outer end portions which protrude from the case 4 and terminate in integral T-shaped connecting lugs 32 and 33, respectively. The edge members 16 and 17 respectively are formed, at their inner end portions, with T-shaped cuts 51 and 52 which are removably engageable with the connecting lugs 32 and 33, respectively. Under a state that the connecting lugs 32 and 33 are in engagement with the cuts 51 and 52, respectively, the power transmission members 18 and 19 and the edge members 16 and 17 are put together to form the blades 14 and 15 which are slidable in opposite directions in the forward and backward directions.

Figure 4:
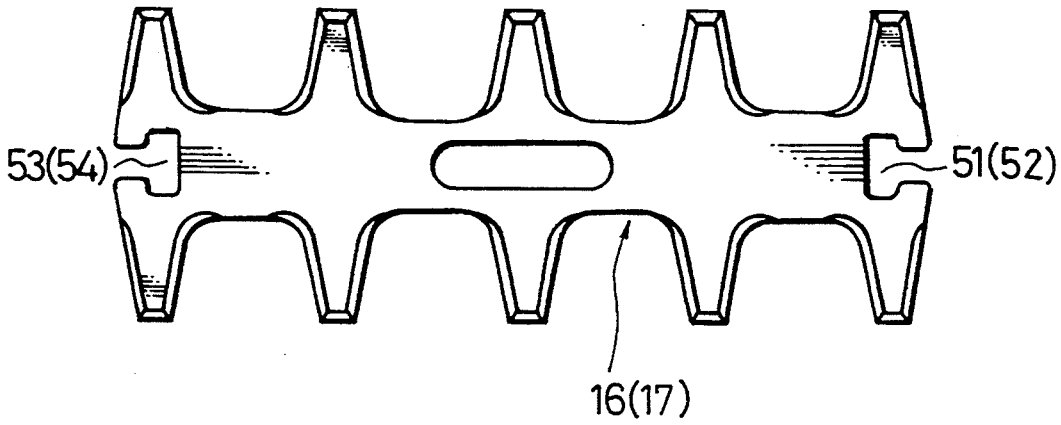
FIG. 4 is a plan view of an edge member.
Figure 5:
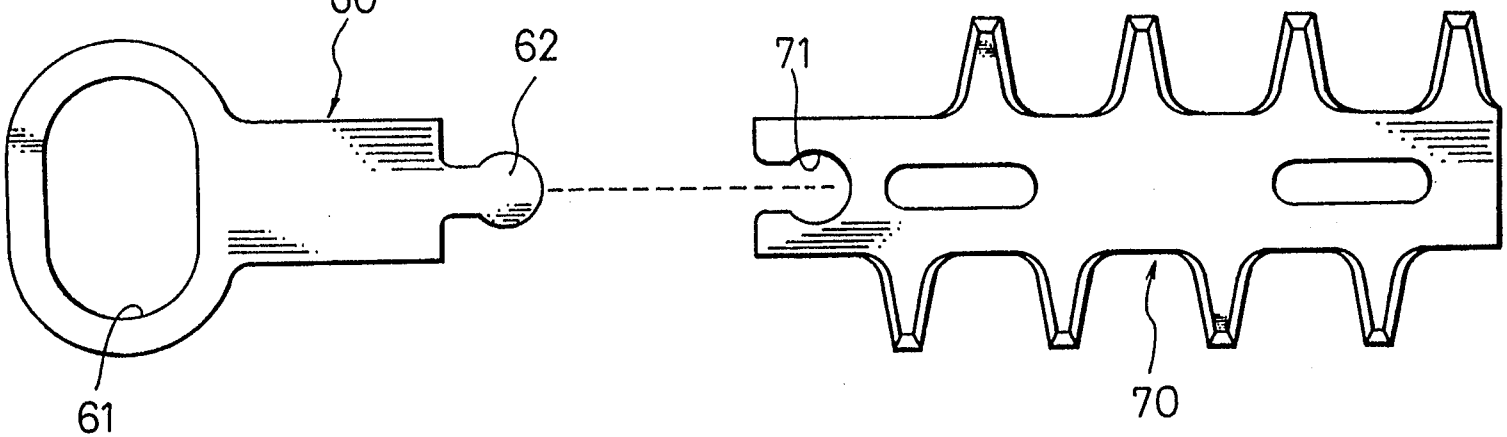
FIG. 5 (PRIOR ART)
FIG. 5 is a plan view showing the essential part of example of a conventional trimmer.

In addition to the T-shaped cut 51 (52), as shown in FIG. 4, the edge member 16 (17) is formed, at the opposite end portion, with another T-shaped cut 53 (54) engageable with the T-shaped connecting lug 32 (33) of the power transmission member 18 (19). In other words, both end portions of each of the edge members 16 and 17 are formed with the T-shaped cuts 51 and 53 (52 and 54).

The lower power transmission member 18 has an intermediate portion within the case 4, which is swelled sidewards to form a laterally curved part 34, and an elongated hole 36 is formed in a longitudinally central part of the laterally curved part 34. Likewise, an intermediate portion within the case 4 of the upper power transmission member 19 is swelled sidewards to form a laterally curved part 35 and an elongated hole 37 is formed in a longitudinally central part of the laterally curved part 35. The elongated holes 36 and 37 overlap each other, and the upper and lower two eccentric cams 12 and 13 are arranged to lie on the top and bottom planes, respectively, of the overlapping elongated holes 36 and 37. The main shaft 7 vertically passes through the eccentric cams 12 and 13 and it is made to be integral with them in such a manner that the upper and lower eccentric cams 12 and 13 are oriented so as to have a phase difference from each other through an angle of 180°.

The upper and lower power transmission members 18 and 19 for the blades overlap each other, and follower members 41 and 42 which follow the cam motion are provided in the direction of forward and backward motion(longitudinal direction) of the blades so as to contact the upper and lower surfaces of the respective overlapping power transmission members 18 and 19 and so as to be flush with the respective eccentric cams 12 and 13. The lower follower member 41 is a plate-like member consisting of a connecting rod 23 and large and small circular rings 25 and 27 contiguous to opposite ends of the connecting rod. The upper follower member 42 has the same shape as above.

The eccentric cams 12 and 13 are pivotally received in the large end rings 25 and 26 of the follower members 41 and 42, respectively. The small endrings 27 and 28 of the follower members 41 and 42 are pivotally mounted on pins 29 and 30, respectively, connected to the blades 14 and 15.

Each of the guide members 20 and 21 has, at its frontal end, a blade tip protector 50.

The operation of the thus constructed reciprocating cutter type trimmer according to the present embodiment of the invention will now be described.

When the main shaft 7 is driven to rotate at reduced speed from the gear reduction unit 3, the eccentric cams 12 and 13 are also rotated. Through this, the upper and lower follower members 41 and 42 are reciprocated to and fro in opposite phases to each other and besides, in synchronism therewith, the power transmission members 18 and 19 of the blades 14 and 15 as well as the edge members 16 and 17 integral therewith are also reciprocated to and fro to thereby cut trees and grass.

Through work such as clipping of grass at ridges, only the tip of the blade is used and the edge is worn out or broken at only the tip (fore end) of the blade. In such an event, exchange of the blade is needed and to this end, the upper guide member 20 and lower guide member 21 are removed, and the engagement of the cut 51 (52) of the edge member 16 (17) with the connecting lug 32 (33) is then released to separate the two; and thereafter the edge member 16 (17) is rotated through 180 ° on its plane, and the cut 53 (54) formed on the longitudinally opposite end is brought into engagement with the connecting lug 32 (33) to complete mounting of the separation type blade 15 (14).

In this manner, the position changing can be effected easily between a relatively lightly damaged portion near the root (rear) of the case 4 and the blade tip portion and therefore, in comparison with the case where the blade is replaced with new one or the edge is ground each time it is damaged, efficient utilization of the edge as resources can be ensured and in addition, time and economical saving can be made. Further, since the edge member is constructed so as to be freely exchangeable, the material and shape of the edge member can be selected in accordance with various work conditions to promote the performance and durability of the reciprocating cutter type trimmer.

The edge is preferably made to be of the double-edged type as illustrated herein to permit one blade to be used four times by changing its direction.

The present invention has been described in detail by way of example but it is in no way limited to the embodiment described previously and design modification can be effected in various ways within the scope of the present invention without departing from the appended claim.

For example, in the illustrated example, both the upper and lower blades are caused to reciprocate but one of them may be a fixed blade. In addition, the shape of the fitting part is not limited to the T-shape but may take a suitable form in consideration of the cutting of material and the prevention of stress concentration.

As will be seen from the foregoing description, according to the present invention, the blade is separated into the power transmission member and the edge member and each of the opposite ends of the edge member is removably mountable to the power transmission member. Therefore, the blade can be simplified in construction and is easy to disassemble and assemble and in addition, the utility of one edge member can be promoted.

What is claimed is:

1. A reciprocating cutter type trimmer having at least one separation type blade (14, 15) which is divided into a power transmission member (18, 19) drivingly coupled to power transmission means (12, 13, 41, 42) for conversion of rotary motion into reciprocation so as to be slidably reciprocative in a longitudinal direction of said blade and an edge member (16, 17) drivingly coupled to said power transmission member; said power transmission member being formed with a first fitting part (32, 33) so as to be removably connectable to said edge member, wherein said edge member (16, 17) has, at its longitudinally opposite ends, second fitting parts (51, 53, 52, 54) engageable with said first fitting part of said power transmission member.

* * * * *